(12) United States Patent
Liao et al.

(10) Patent No.: US 6,591,361 B1
(45) Date of Patent: Jul. 8, 2003

(54) METHOD AND APPARATUS FOR CONVERTING DATA INTO DIFFERENT ORDINAL TYPES

(75) Inventors: Yu-Chung Liao, Austin, TX (US); Peter A. Sandon, Essex Junction, VT (US); Howard Cheng, Redmond, WA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/473,760

(22) Filed: Dec. 28, 1999

(51) Int. Cl.$^7$ .................. G06F 9/302; G06F 9/315
(52) U.S. Cl. .................. 712/222; 712/221; 708/495; 708/208; 708/517
(58) Field of Search .................. 712/222, 41, 221, 712/227; 708/517, 495, 208

(56) References Cited

U.S. PATENT DOCUMENTS

| | | | |
|---|---|---|---|
| 3,626,167 A | 12/1971 | Guck et al. | 235/155 |
| 3,805,041 A | 4/1974 | Langheinrich | 235/155 |
| 3,872,442 A | 3/1975 | Boles et al. | 340/172.5 |
| 4,084,224 A | 4/1978 | Appell et al. | 364/200 |
| 4,177,510 A | 12/1979 | Appell et al. | 364/200 |
| 4,541,046 A | 9/1985 | Nagashima et al. | 364/200 |
| 4,626,825 A | * 12/1986 | Burleson et al. | 708/519 |
| 4,631,696 A | 12/1986 | Sakamoto | 364/748 |
| 4,805,128 A | 2/1989 | Nelson et al. | 364/715.03 |
| 4,841,438 A | 6/1989 | Yoshida et al. | 364/200 |
| 4,881,168 A | 11/1989 | Inagami et al. | 364/200 |
| 5,073,970 A | 12/1991 | Aoyama et al. | 395/800 |
| 5,161,117 A | 11/1992 | Waggener, Jr. | 364/715.03 |
| 5,170,474 A | 12/1992 | Sakamura et al. | 395/375 |
| 5,201,058 A | 4/1993 | Kinoshita et al. | 395/800 |
| 5,226,171 A | 7/1993 | Hall et al. | 395/800 |
| 5,261,113 A | 11/1993 | Jouppi | 395/800 |
| 5,299,320 A | 3/1994 | Aono et al. | 395/375 |
| 5,418,973 A | 5/1995 | Ellis et al. | 395/800 |
| 5,423,051 A | 6/1995 | Fuller et al. | 395/800 |
| 5,510,934 A | 4/1996 | Brennan et al. | 395/446 |
| 5,513,366 A | 4/1996 | Agarwal et al. | 395/800 |
| 5,526,504 A | 6/1996 | Hsu et al. | 395/417 |
| 5,537,538 A | 7/1996 | Bratt et al. | 395/183.14 |
| 5,537,606 A | 7/1996 | Byrne | 395/800 |
| 5,561,615 A | 10/1996 | Kuo et al. | 364/715.03 |
| 5,561,808 A | 10/1996 | Kuma et al. | 395/800 |
| 5,572,704 A | 11/1996 | Bratt et al. | 395/488 |
| 5,574,924 A | 11/1996 | Yoshinaga et al. | 395/800 |
| 5,604,909 A | 2/1997 | Joshi et al. | 395/384 |
| 5,632,025 A | 5/1997 | Bratt et al. | 395/479 |
| 5,638,500 A | 6/1997 | Donovan et al. | 395/134 |
| 5,669,013 A | 9/1997 | Watanabe et al. | 395/825 |
| 5,673,407 A | 9/1997 | Poland et al. | 395/375 |
| 5,687,106 A | 11/1997 | Schwarz et al. | 364/748 |
| 5,689,653 A | 11/1997 | Karp et al. | 395/250 |
| 5,694,567 A | 12/1997 | Bourekas et al. | 395/403 |
| 5,734,874 A | 3/1998 | Van Hook et al. | 395/513 |
| 5,740,402 A | 4/1998 | Bratt et al. | 395/484 |

(List continued on next page.)

*Primary Examiner*—Daniel H. Pan
(74) *Attorney, Agent, or Firm*—Richard A. Henkler

(57) ABSTRACT

A method and apparatus that converts integer numbers to/from floating point representations while loading/storing the data. The method and apparatus perform this conversion within a central processing unit having a converter unit and a set of conversion registers. The load/store instructions having data requiring conversion include an index field for identifying one of the conversion registers. Each one of the conversion registers includes information on the type of conversion required and any scaling factors to be applied. Upon receiving one of these instructions, the converter uses the identified conversion register to perform the conversion and stores the converted data into the corresponding register or memory location.

26 Claims, 4 Drawing Sheets

U.S. PATENT DOCUMENTS

| | | | |
|---|---|---|---|
| 5,742,277 A | 4/1998 | Gossett et al. | 345/136 |
| 5,774,685 A | 6/1998 | Dubey | 395/381 |
| 5,812,147 A | 9/1998 | Van Hook et al. | 345/511 |
| 5,838,971 A | 11/1998 | Stadler et al. | 395/684 |
| 5,848,286 A | 12/1998 | Schiffleger et al. | 395/800.04 |
| 5,864,703 A | 1/1999 | Van Hook et al. | 395/800.22 |
| 5,874,910 A | 2/1999 | Cooper | 341/143 |
| 5,875,464 A | 2/1999 | Kirk | 711/129 |
| 5,875,465 A | 2/1999 | Kilpatrick et al. | 711/134 |
| 5,887,160 A * | 3/1999 | Lauritzen et al. | 712/222 |
| 5,898,854 A | 4/1999 | Abramson et al. | 395/394 |
| 5,898,882 A | 4/1999 | Kahle et al. | 395/800.23 |
| 5,931,945 A | 8/1999 | Yung et al. | 712/898 |
| 5,933,157 A | 8/1999 | Van Hook et al. | 345/513 |
| 5,933,650 A | 8/1999 | Van Hook et al. | 395/800.02 |
| 5,938,756 A | 8/1999 | Van Hook et al. | 712/23 |
| 5,946,496 A | 8/1999 | Sugumar et al. | 395/800.02 |
| 5,954,815 A | 9/1999 | Joshi et al. | 712/237 |
| 5,966,734 A | 10/1999 | Mohamed et al. | 711/173 |
| 5,982,939 A | 11/1999 | Van Hook | 382/255 |
| 6,006,315 A | 12/1999 | Park | 712/7 |
| 6,014,728 A | 1/2000 | Baror | 711/133 |
| 6,044,478 A | 3/2000 | Green | 714/42 |
| 6,058,456 A | 5/2000 | Arimilli et al. | 711/129 |
| 6,058,465 A | 5/2000 | Nguyen | 712/7 |
| 6,075,906 A | 6/2000 | Fenwick et al. | 382/298 |
| 6,092,159 A | 7/2000 | Ekner et al. | 711/152 |
| 6,098,162 A | 8/2000 | Schiffleger et al. | 712/4 |
| 6,105,112 A | 8/2000 | Arimilli et al. | 711/141 |
| 6,112,280 A | 8/2000 | Shah et al. | 711/129 |
| 6,141,673 A | 10/2000 | Thayer et al. | 708/402 |
| 6,148,373 A | 11/2000 | Hsu et al. | 711/125 |
| 6,166,748 A | 12/2000 | Van Hook et al. | 345/522 |
| 6,167,507 A | 12/2000 | Mahalingaiah et al. | 712/213 |

* cited by examiner

METHOD AND APPARATUS FOR CONVERTING DATA INTO DIFFERENT ORDINAL TYPES

TECHNICAL FIELD OF THE PRESENT INVENTION

The present invention generally relates to methods and apparatuses that convert data, and more specifically, convert data from one ordinal type to another while loading/storing the data.

BACKGROUND OF THE PRESENT INVENTION

The electronic industry is in a state of evolution spurred by the unquenchable desire of the consumer for better, faster, smaller, and more functional electronic devices. In their attempt to satisfy these demands, the electronic industry must constantly strive to improve the speeds at which these desirable functions are performed.

Many of today's electronic devices gather user interaction using components (e.g. joystick) that generate analog signals to represent the interaction process. The monitoring of these signals is typically accomplished using an Analog-to-Digital (A/D) converter which converts the received analog signals to integer representations. In more complex devices, there are often numerous such A/D converters each of which can provide differing formats for the integer representation (signed, unsigned, 8/16/32 bit etc . . . ). These integer representations are typically processed using some scaling factor in order to produce a desired result.

Current methodologies use software to convert and scale these integer representations into a desired format. Although software can perform the conversion and any necessary scaling, the time necessary to conduct such tasks is often cost prohibitive. It would, therefore, be a distinct advantage to have a method and apparatus that would scale and convert these integer representations into a desired format in a time efficient manner. The present invention provides such a method and apparatus.

SUMMARY OF THE PRESENT INVENTION

The present invention is a method and apparatus that converts integer numbers into floating point representations while loading the data, and converts floating point numbers into integer representations while storing the data. The method and apparatus perform this conversion within a central processing unit having a converter unit and a set of conversion registers. Load instructions having integer data requiring conversion include an index field for identifying one of the conversion registers. Each one of the conversion registers includes information on the type of conversion required and any scaling factors to be applied. Upon receiving the data from memory, the converter uses the identified conversion register to convert the integer data into a floating point representation and saves this representation into the corresponding floating point register.

Store instructions having floating point data requiring conversion include an index field for identifying one of the conversion registers. Upon receiving the data from the floating point register, the converter uses the identified conversion register to convert the floating point data into an integer number and store the data into the corresponding memory location.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth, however, it will be obvious to those of ordinary skill in the art that the present invention can be practiced with different details. In other instances, well-know circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
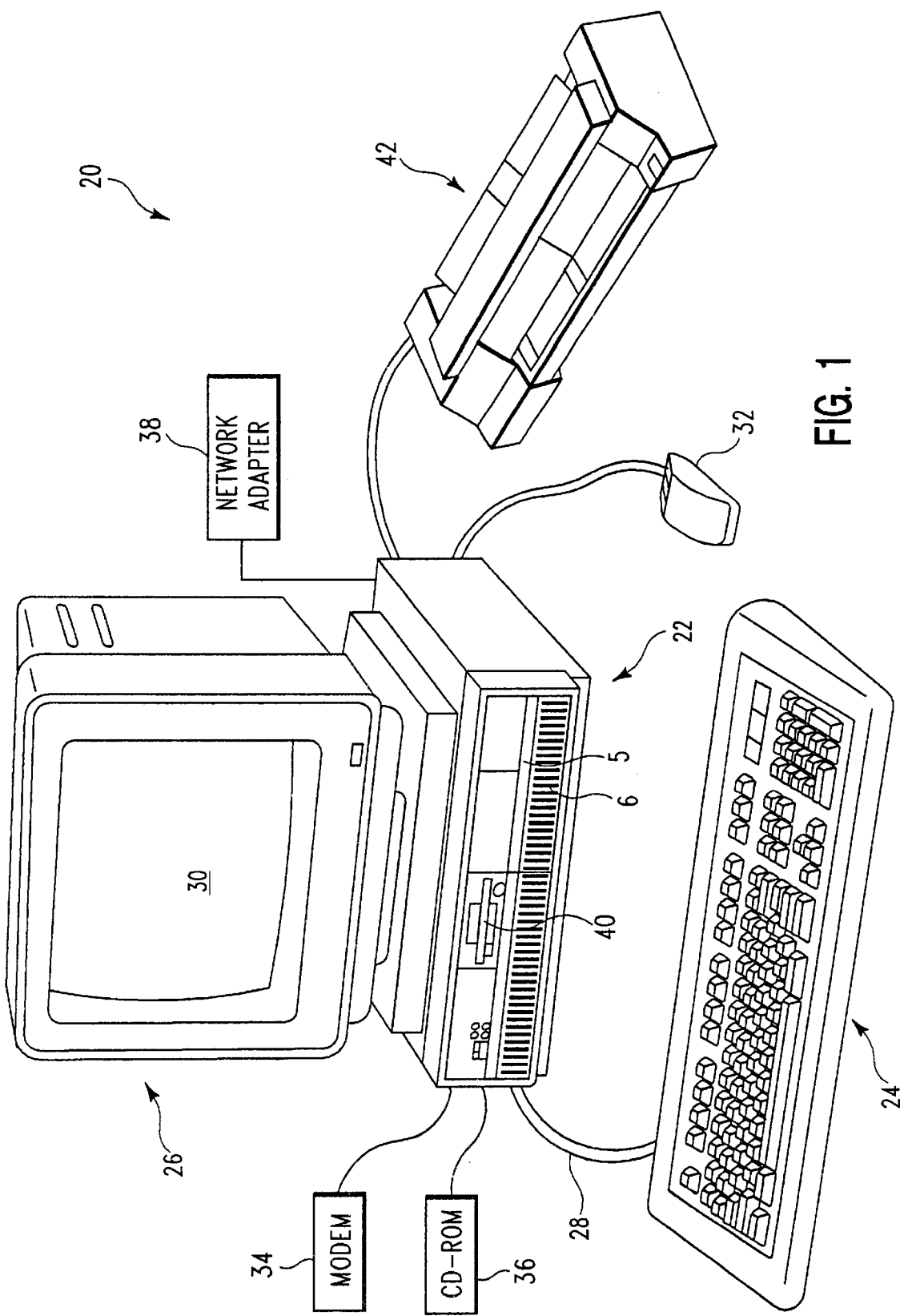
FIG. 1 is a diagram of a data processing system in which the present invention can be practiced.
Figure 2:
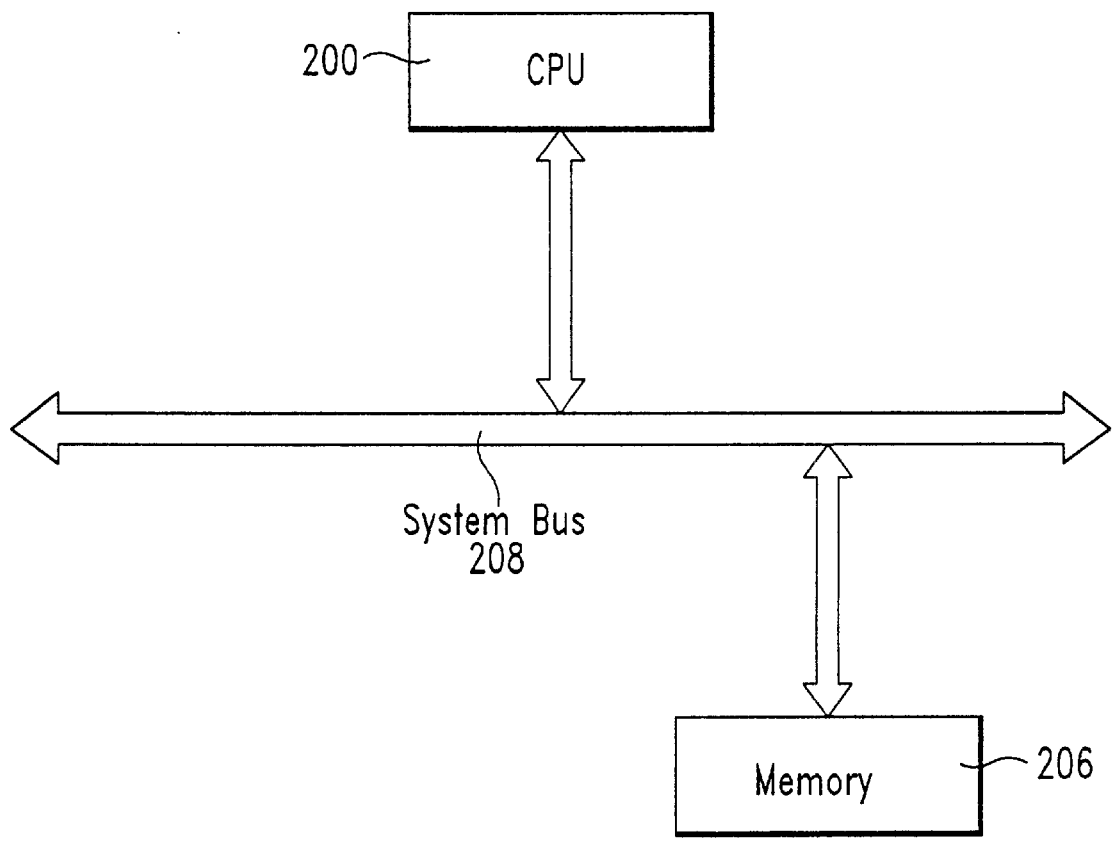
FIG. 2 is a detailed diagram of the processing unit of FIG. 1 according to the teachings of the present invention.

FIG. 1 is a diagram of a data processing system 20 in which the present invention can be practiced. The data processing system 20 includes a processing unit 22, a keyboard 82, and a display 96. The keyboard 82 is coupled to the processing unit 22 by a cable 28. The display 96 includes display screen 30, which may be implemented using a cathode ray tube (CRT) a liquid crystal display (LCD) an electrode luminescent panel or the like. The data processing system 20 also includes a pointing device 84, which may be implemented using a track ball, a joy stick, touch sensitive tablet or screen, track path, or as illustrated a mouse 32. The pointing device 84 may be used to move a pointer or cursor on the display screen 30. Processing unit 22 may also be coupled to one or more peripheral devices such as modem 92, CD-ROM 78, network adapter 90, and floppy disk drive 40, each of which may be internal or external to the enclosure or processing unit 22. An output device such as printer 100 may also be coupled with processing unit 22. More details concerning selected components residing within processing unit 22 are illustrated and explained in connection with FIG. 2.

Figure 3:
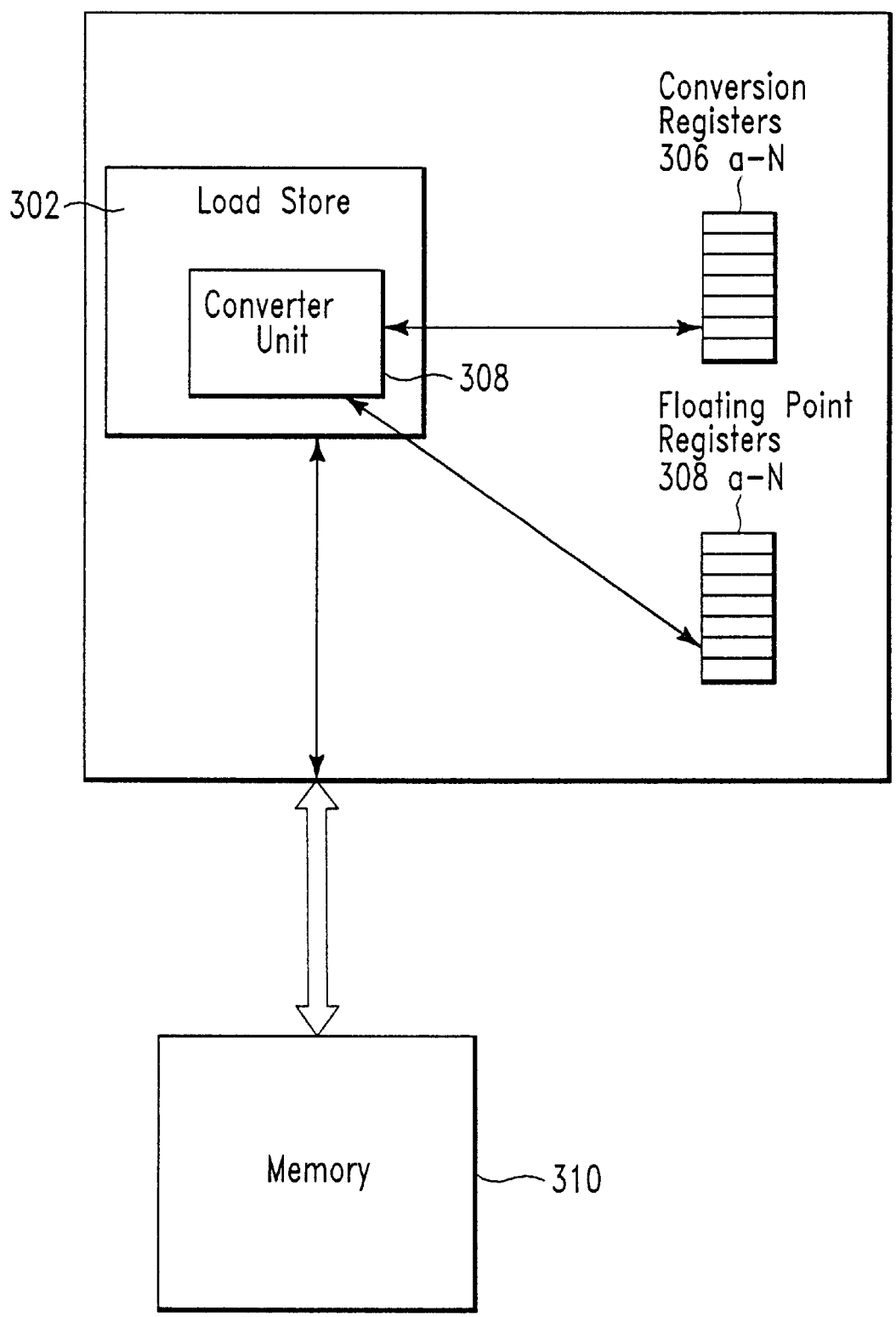
FIG. 3 is a detailed diagram of the central processing unit of FIG. 2 according to the teachings of the present invention.

Located within processing unit 22 is a Central Processing Unit 200 (FIG. 2), and a Memory Unit 206, both of which are coupled to a System Bus 208 which provides communication between the interconnected components. The means for connecting (e.g. bus bridges), controlling and ordering communication between the System Bus 208 and the various components is well understood by those of ordinary skill in the art, and therefore, further discussion is unnecessary. Selected components of the CPU 200 are illustrated and explained in greater detail in connection with FIG. 3.

In general, CPU 200 contains various components that are commonly found within central processing units (e.g. floating point unit, instruction cache, an instruction unit, etc.) whose operations and functions are well understood by those of ordinary skill in the art, and therefore, not shown in order not to obscure the present invention in unnecessary detail. CPU 200 includes a Load/Store Unit 302 (FIG. 3), a set of Conversion Registers 306a–n, and a set of Floating Point Registers 308a–n.

The Load/Store Unit 302 retrieves and stores data from/to Memory 310. For ease of explanation, Memory 310 represents either cache hierarchies located within or between the System Bus 208 and/or system Memory Unit 206.

In the preferred embodiment, each one of the Conversion Registers 306a–n contains specific information on converting and scaling a known integer data type into a floating point data type. Those skilled in the art will readily recognize that the present invention is equally applicable to conversion of other ordinal types (e.g. integer to real, etc . . . ).

Figure 4:
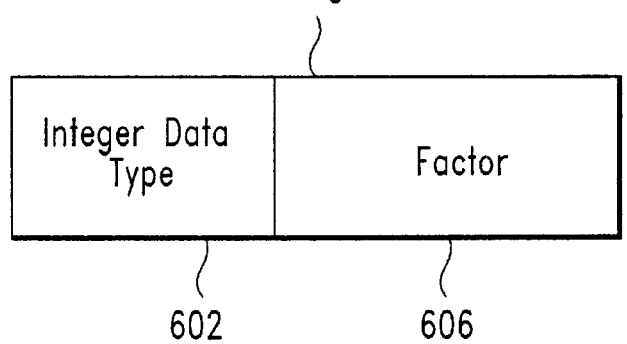
FIG. 4 is data structure diagram for one of the conversion registers of the central processing unit of FIG. 3 according to the teachings of the present invention.

As shown in FIG. 4, each one of the Conversion Registers 306a–n includes the following fields: 1) an Integer data type 602; and 2) a Scaling Factor 606. The Integer data type 602 specifies the data type (e.g. signed/unsigned, 8/16/32 bits, . . . ) of the data prior to any conversion being performed ("Original Data"). The Scaling Factor 606 specifies any scaling factor that is to be applied during the conversion of the Original Data (e.g. a multiplier).

The Converter Unit 308 converts the Original Data prior to its storing or retrieval from one of the Floating Point Registers 308a–n. The interaction between the various units 302–308 during a load operation is explained in greater detail in connection with the flow chart of FIG. 5 as explained below.

Figure 6:
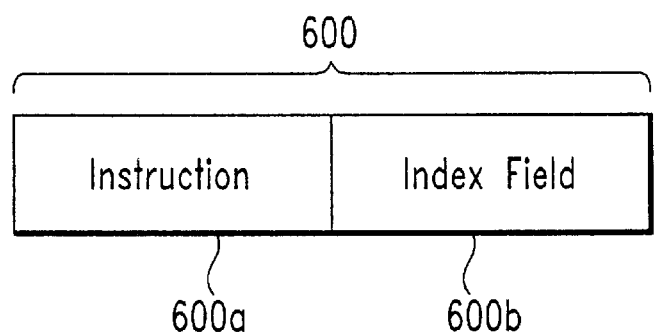
FIG. 6 is a load/store instruction that is used for converting integers to/from floating point representations according to the teachings of the present invention.

The preferred embodiment of the present invention uses a specialized load/store instruction as illustrated in FIG. 6. More specifically, the load/store instruction 600 includes the load/store command 600a ("instruction") and an index field 600b for identifying one of the conversion registers 306a–n.

Figure 5:
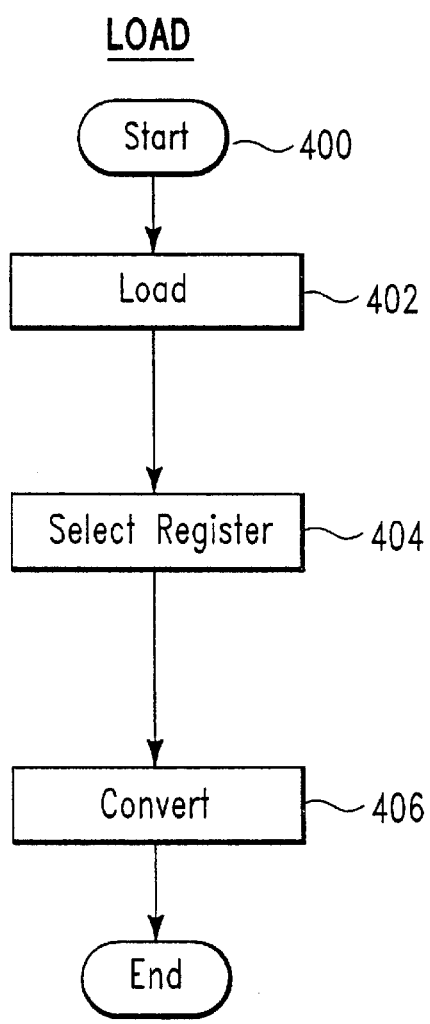
FIG. 5 is a flow chart illustrating the steps for processing a load instruction according to the teachings of the present invention.

As illustrated in FIG. 5, the processing of a load operation begins whenever data is required by the CPU 200 (Step 400), the Load/Store Unit 302 retrieves the data from the Memory 310 (Step 402) ("Integer Data"). Prior to storing the specified data, the Converter Unit 308 uses the Index field 600b to retrieve the identified Conversion Register 306a–n (Step 404). The retrieved Conversion Register 306 a–n is then used to covert and scale the specified data (Step 406) ("Converted Data"). In the preferred embodiment, the retrieved Conversion Register 306a–n is used to convert an integer number to a floating point representation. The Converted Data is then stored within the specified Floating Point Register 308a–n for processing.

Figure 7:
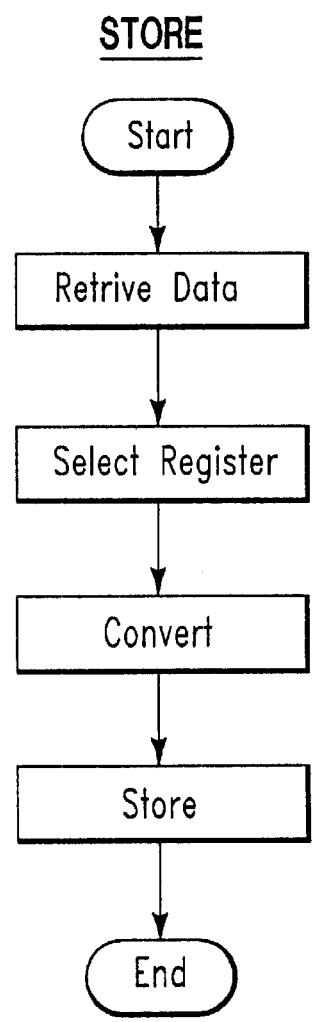
FIG. 7 is a flow chart illustrating the steps for processing a store instruction according to the teachings of the present invention.

The interaction between the various units 302–308 during a store operation is explained in greater detail in connection with the flow chart of FIG. 7.

The processing of a store operation begins whenever data is to be stored to Memory 308 (Step 500). The to be stored data is retrieved from the corresponding Floating Point Register 308a–n (Step 502) via the Converter Unit 308. The Converter unit 308 uses the Index field 600a again to retrieve the identified Conversion Register 306a–n (Step 504). The Factor 608 and Desired Type 604 fields are used to convert the Converted Data back to its original type (Step 506). Thereafter, the Load/Store Unit 302 stores the processed data in Memory 310.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. In a cental processing unit, a method of converting a number of a first ordinal type to a second ordinal type, the method comprising the steps of:

creating a plurality of conversion registers each having a data type and a scaling factor;

executing a load instruction having a first number and an identifier for identifying one of the conversion registers;

retrieving the data type and scaling factor from the identified register;

scaling the first number according to the retrieved scaling factor; and coverting the scaled number to the different ordinal type.

2. The method of claim 1 wherein the first number is an integer and the different ordinal type is a floating point.

3. In a central processing unit, a method of converting a floating point to an integer representation, the method comprising the steps of:

creating a plurality of conversion registers each specifying a scaling facbr and an integer data type;

executing a store instruction having a first integer and an identifier for identifying one of the conversion registers;

retrieving, in response to the execution of a load instruction, the integer data type and scaling factor from the identified register;

scaling the first integer according to the scaling factor; and converting the scaled integer to a floating point representation.

4. In a central processing unit, a method of converting a number of a first ordinal type to a second ordinal type, the method comprising the steps of:

creating a plurality of conversion registers each having a data type and a scaling factor;

executing a store instruction having a first number and an identifier for identifying one of the conversion registers;

retrieving the data type and scaling factor from the identified register;

scaling the first number according to the retrieved scaling factor; and converting the scaled number to the different ordinal type.

5. The method of claim 4 wherein the first number is an integer and the different ordinal type is a floating point.

6. In a central processing unit, a method of converting numbers of a first ordinal type to a second ordinal type, the method comprising the steps of:

creating a plurality of conversion registers each containing information for converting a number of a first ordinal type to a different ordinal type;

executing a load instruction having a first number of a first ordinal type and an identifier for identifying one of the conversion registers;

converting, in response to the execution of the load instruction, the first number to the different ordinal type;

executing a store instruction having the converted number and the identifier; and converting, in response to the execution of the store instruction, the ordinal type of the converted number to the first ordinal type.

7. The method of claim 6 wherein each one of the registers includes the data type and a scaling factor.

8. The method of claim 7 wherein the step of converting, in response to the execution of the load instruction, the first number to the different ordinal type includes the steps of:

retrieving the data type and scaling factor from the identified register;

scaling the first number according to the retrieved scaling factor; and converting the scaled number to the different ordinal type.

9. The method of claim 8 wherein the first ordinal type is an integer and the different ordinal type is a floating point.

10. The method of claim 9 wherein the step of converting, in response to the execution of the store instruction, the ordinal type of the converted number to the first ordinal type includes the steps of:

retrieving the data type and scaling factor from the identified register;

translating the converted number to the first ordinal type and the data type; and scaling the translated number according to the retrieved scaling factor.

11. The method of claim 10 wherein the step of scaling the translated number includes the step of:

scaling the translated number by the inverse of the retrieved scaling factor.

12. The method of claim 11 wherein the step of converting, in response to the execution of the load instruction, the first number to the different ordinal type includes the steps of:

retrieving the data type and scaling factor from the identified register;

converting the scaled number to the different ordinal type; and scaling the converted number according to the retrieved scaling factor.

13. The method of claim 12 wherein the first ordinal type is an integer and the different ordinal type is a floating point.

14. The method of claim 11 wherein the step of converting, in response to the execution of the store instruction, the ordinal type of the converted number to the first ordinal type includes the steps of:

retrieving the data type and scaling factor from the identified register;

descaling the scaled number according to the retrieved scaling factor; and translating the re-scaled number to the first ordinal type and the data type.

15. The method of claim 14 wherein the step of descaling the scaled number includes the step of:

re-scaling the converted number by the inverse of the retrieved scaling factor.

16. In a central processing unit, an apparatus for converting a number of a first ordinal type to a second ordinal type, the apparatus comprising:

a plurality of conversion registers each including a data type and a scaling factor;

means for executing a load instruction having a first number and an identifier for identifying one of the conversion registers;

means for retrieving the data type and scaling factor from the identified register;

means for scaling the first number according to the retrieved scaling factor; and means for converting the scaled number to the different ordinal type.

17. The apparatus of claim 16 wherein the first number is an integer and the different ordinal type is a floating point.

18. In a central processing unit, an apparatus for converting numbers of a first ordinal type to a second ordinal type, the apparatus comprising:

a plurality of conversion registers each containing information for converting a number of a first ordinal type to a different ordinal type;

means for executing a load instruction having a first number of a first ordinal type and an identifier for identifying one of the conversion registers;

means for converting, in response to the execution of the load instruction, the first number to the different ordinal type;

means for executing a store instruction having the converted number and the identifier; and means for converting, in response to the execution of the store instruction, the ordinal type of the converted number to the first ordinal type.

19. The apparatus of claim 18 wherein each one of the registers includes the data type and a scaling factor.

20. The apparatus of claim 19 wherein the means for converting, in response to the execution of the load instruction, the first number to the different ordinal type includes:

means for retrieving the data type and scaling factor from the identified register;

means for scaling the first number according to the retrieved scaling factor; and means for converting the scaled number to the different ordinal type.

21. The apparatus of claim 20 wherein the first ordinal type is an integer and the different ordinal type is a floating point.

22. The apparatus of claim 21 wherein the means for converting, in response to the execution of the store instruction, the ordinal type of the converted number to the first ordinal type includes:

means for retrieving the data type and scaling factor from the identified register;

means for translating the converted number to the first ordinal type and the data type; and means for scaling the translated number according to the retrieved scaling factor.

23. The apparatus of claim 22 wherein the means for scaling the translated number includes:

means for scaling the translated number by the inverse of the retrieved scaling factor.

24. In a central processing unit, a method of converting a number of a first ordinal type to a second ordinal type, the method comprising the steps of:

creating a plurality of conversion registers each having a data type and a scaling factor, executing a store instruction having a first number and an identifier for identifying one of the conversion registers;

retrieving the data type and scaling factor from the identified register;

covering the first number to the different ordinal type; and scaling the coverted number according to the retrieved scaling factor.

25. The method of claim 24, wherein the first number is an integer and the different ordinal type is a floating point.

26. The method of claim 25 wherein the step of scaling the converted number includes the step of:

scaling the converted number by the inverse of the retrieved scaling factor.

* * * * *